(12) United States Patent
McCord et al.

(10) Patent No.: US 7,136,014 B2
(45) Date of Patent: Nov. 14, 2006

(54) SYSTEM AND METHOD FOR ESTIMATING THE AZIMUTH POINTING ANGLE OF A MOVING MONOPULSE ANTENNA

(75) Inventors: Henry McCord, Los Angeles, CA (US); Bernard Schweitzer, Los Angeles, CA (US); Eric B. Jensen, Hermosa Beach, CA (US); Steve A. Hallman, Redondo Beach, CA (US)

(73) Assignee: The Boeing Company, Chicago, IL (US)

( * ) Notice: Subject to any disclaimer, the term of this patent is extended or adjusted under 35 U.S.C. 154(b) by 178 days.

(21) Appl. No.: 10/996,630

(22) Filed: Nov. 23, 2004

(65) Prior Publication Data

US 2006/0109172 A1 May 25, 2006

(51) Int. Cl.
*G01S 13/00* (2006.01)

(52) U.S. Cl. .............. 342/149; 342/137; 342/141; 342/152; 342/194

(58) Field of Classification Search ............. 342/80, 342/113, 137, 139–141, 147–152, 194
See application file for complete search history.

(56) References Cited

U.S. PATENT DOCUMENTS

| | | | | |
|---|---|---|---|---|
| 4,472,718 A * | 9/1984 | Ohashi et al. | | 342/148 |
| 4,649,390 A * | 3/1987 | Andrews et al. | | 342/140 |
| 5,400,036 A * | 3/1995 | Kochiyama et al. | | 342/370 |
| 5,442,364 A * | 8/1995 | Lee et al. | | 342/372 |
| 5,790,071 A * | 8/1998 | Silverstein et al. | | 342/354 |
| 6,288,671 B1 * | 9/2001 | Wu et al. | | 342/357.11 |
| 6,417,803 B1 * | 7/2002 | de La Chapelle et al. | | 342/359 |
| 6,433,736 B1 * | 8/2002 | Timothy et al. | | 342/359 |
| 6,731,240 B1 * | 5/2004 | Dybdal et al. | | 342/359 |
| 6,825,806 B1 * | 11/2004 | Liu et al. | | 342/359 |
| 2006/0109172 A1 * | 5/2006 | McCord et al. | | 342/149 |

OTHER PUBLICATIONS

"An application of the monopulse principle to determining elevation angles in SAR images", Freeman, A.; Zink, M. Geoscience and Remote Sensing, IEEE Transactions on vol. 32, Issue 3, May 1994 Ps:616-625.*

"Oceanic low-angle monopulse radar tracking errors", Griesser, T.; Balanis, C.Oceanic Engineering, IEEE Journal of vol. 12, Issue 1, Jan. 1987 Ps: 289-295.*

* cited by examiner

*Primary Examiner*—John B. Sotomayor
(74) *Attorney, Agent, or Firm*—Canady & Lortz LLP; Bradley K. Lortz

(57) ABSTRACT

An invention is provided for determining the azimuth pointing angle of a moving monopulse antenna. Pulses of energy are broadcast at the surface of a planetary body. Reflected signals are received from the surface of the planetary body using a plurality of feeds. A monopulse ratio is then calculated based on a sum pattern and a difference pattern. The sum pattern is based on the sum of the reflected signals received using the feeds, and the difference pattern is based on a difference of the reflected signals received using the feeds. An azimuth pointing angle of a monopulse antenna is then calculated using the monopulse ratio.

20 Claims, 7 Drawing Sheets

SYSTEM AND METHOD FOR ESTIMATING THE AZIMUTH POINTING ANGLE OF A MOVING MONOPULSE ANTENNA

BACKGROUND OF THE INVENTION

1. Field of the Invention

This invention relates generally to tracking devices, and more particularly to estimating the azimuth pointing angle of a monopulse antenna.

2. Description of the Related Art

Currently, monopulse detection systems are widely utilized in airborne and spaceborne radar systems to locate moving targets. A monopulse detection system detects an azimuth angle to a target and thereafter locates the absolute position of the target based on the monopulse antenna azimuth and elevation azimuth pointing angles and the relative azimuth angle to the target. In particular, a signal is radiated from a transmitting antenna and reflected off the target. The reflected signal then is received at the monopulse detection system through two or more receiving feeds. Utilizing the phase between the signals received at the individual feeds, data regarding the azimuth angle of the target to the detection system is determined, as illustrated in FIG. 1.

FIG. 1 is a schematic diagram showing an exemplary prior art monopulse detection system 100. The monopulse detection system 100 includes a signal generator 102 coupled to a transmitting feed 104. In addition, two receive channels 110 and 114 are located to either side of a feed axis boresight 118. The receive channels 110 and 114 each include a receiving feed 106 and 108 coupled to signal processing logic 116.

In operation, the signal generator 102 generates a signal, which is radiated or emitted from the transmitting feed 104. When a target is within the cross-range of the monopulse detection system 100, the target reflects the radiated signal, which in turn is received by two receiving feeds 106 and 108. The received signals are converted into low frequency signals and subjected to signal analytic processing utilizing the signal processing logic 116.

The signal processing logic 116 adds the signals received from the two receiving feeds 106 and 108 to obtain a sum pattern. In addition, the signal processing logic 116 calculates a difference between the signals received from the two receiving feeds 106 and 108 to obtain a difference pattern. That is, the signal received from one receive channel, such as receive channel 114, is subtracted from the signal received from the other receive channel, in this example receive channel 110. The resulting difference pattern has a property wherein the difference pattern is positive when the target is located on the side associated with receive channel 110. Then, as the target crosses the boresight 118 of the feed axis, the difference pattern becomes negative because the signal is stronger in the side associated with receive channel 114. Hence, the difference pattern is null in the middle, at the boresight 118, positive on one side of the boresight 118 and negative in the other side of boresight 118.

The sum pattern is used to indicate the target is in the cross-range of the monopulse detection system 100, while the difference pattern is used to determine where the target is relative to the boresight 118. Hence, in the example above, when the target is to the side associated with receive channel 110 the difference pattern is positive. When the target is to the side associated with receive channel 114 the difference pattern is negative. Finally, when the target is in the middle of the receive channels 110 and 114 there is a null in the difference pattern because the energy coming into the two feeds 106 and 108 is equal. Thus, when a strong signal is present in the sum pattern and the difference pattern is null, the target is located along the boresight 118 of the monopulse detection system 100.

As can be appreciated, the above described monopulse measurement provides an angle measurement relative to the boresight 118 of the monopulse detection system 100. To obtain an absolute measurement of the target's location in space, the monopulse antenna azimuth pointing angle should be known. The monopulse antenna azimuth pointing angle is the position angle of the boresight 118 of the monopulse detection system 100, referred to hereinafter as the monopulse null angle. For example, if the monopulse detection system 100 is a radar in orbit and a target is detected on the ground, a monopulse measurement will detect the target's location as an angle relative to the boresight 118 of the radar. However, to obtain the latitude and longitude of the target, the monopulse null angle of the radar should be determined.

In the prior art, the orbiting radar might, for example, include a housing holding a star tracker and gyroscopes. The star tracker and gyroscopes can then be utilized to determine the position and orientation of the housing, which is located a distance away from the antenna. To get absolute positional information regarding the monopulse null angle, the angle between the antenna boresight 118 and the star tracker housing must be determined with extreme accuracy, which is a very cumbersome operation to perform. Moreover, small inaccuracies in the monopulse null angle can introduce large errors in the monopulse measurement angle of a moving target relative to the boresight 118, particularly for spaceborne radar systems. These errors limit the accuracy with which the absolute position of the moving target can be established. As a result, the usefulness of spaceborne radar systems designed to detect and locate moving targets is limited.

In view of the foregoing, there is a need for systems and methods that accurately determine the monopulse null angle of a monopulse detection system. The systems and methods should be capable of measuring the monopulse null angle regardless of antenna misalignments or instabilities. Hence, the systems and methods should not rely on separate detection mechanisms such as star trackers or gyroscopes.

SUMMARY OF THE INVENTION

Broadly speaking, embodiments of the present invention address these needs by obtaining a ground signature, which is utilized to deduce very accurately where the antenna is pointing. In this manner, the monopulse antenna azimuth pointing angle can be determined regardless of antenna misalignments or instabilities. In one embodiment, a method for determining an azimuth pointing angle of a monopulse antenna is disclosed. In general, the velocity and location of the monopulse antenna are determined. In addition, the velocity and location of a nearby planetary body, such as the Earth, within range of the monopulse antenna are determined. Then, the azimuth pointing angle of the monopulse antenna is calculated based on the antenna velocity, antenna location, planetary velocity, and a planetary location. In determining the velocity and location of the planetary body, pulses of energy can be broadcast to a surface of the planetary body. In response, a plurality of Doppler shifted frequencies is received. The Doppler shifted frequencies can then be separated into frequency components and stored.

The Doppler shifted frequencies can then be utilized to determine an azimuth pointing angle of the monopulse antenna.

An additional method for determining the azimuth pointing angle of a monopulse antenna is disclosed in a further embodiment of the present invention. As above, pulses of energy are broadcast at the surface of a planetary body. In response, reflected signals are received from the surface of the planetary body using a plurality of feeds. A monopulse ratio is then calculated based on a sum pattern and a difference pattern. The sum pattern is based on the sum of the reflected signals received using the feeds, and the difference pattern is based on a difference of the reflected signals received using the feeds. An azimuth pointing angle of a monopulse antenna is then calculated using the monopulse ratio. To calculate the monopulse ratio, the difference pattern is divided by the sum pattern. In addition, a monopulse null frequency, which is the frequency wherein the monopulse ratio is null, can be determined. In this case, the azimuth pointing angle of a monopulse antenna can be calculated based on the monopulse null frequency.

In a further embodiment, a system for determining an azimuth pointing angle of a monopulse antenna is disclosed. The system includes a transmitting feed capable of broadcasting pulses of energy at the surface of a planetary body. Also included is a plurality of receiving feeds capable of receiving reflected signals from the surface of the planetary body. In addition, logic is included that calculates a monopulse ratio based on a sum pattern and a difference pattern. As above, the sum pattern is based on a sum of the reflected signals received using the feeds, and the difference pattern is based on a difference of the reflected signals received using the feeds. Logic is also included that calculates an azimuth pointing angle of the monopulse antenna using the monopulse ratio. Logic can also be included that determines the monopulse null frequency, and calculates the azimuth pointing angle of a monopulse antenna based on the monopulse null frequency. As above, the reflected signals generally comprise a plurality of Doppler shifted frequencies. Hence, logic can be included that separates the Doppler shifted frequencies into frequency components, and stores a representation of energy measured in each frequency component in sum and difference Doppler filters.

In this manner, embodiments of the present invention determined the monopulse antenna azimuth pointing angle regardless of antenna misalignments or instabilities. Moreover, embodiments of the present invention provide increased precision for tracking purposes. For example, embodiments of the present invention typically can have an error standard deviation of less than 60 meters at a range of 14,224 km. Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE PREFERRED EMBODIMENTS

An invention is disclosed for determining the azimuth pointing angle of a monopulse antenna. In general, embodiments of the present invention determine the monopulse null angle of a monopulse antenna by obtaining a ground signature, which is utilized to deduce very accurately where the antenna is pointing. In this manner, the monopulse antenna azimuth pointing angle can be determined regardless of antenna misalignments or instabilities.

In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to unnecessarily obscure the present invention.

Figure 1:
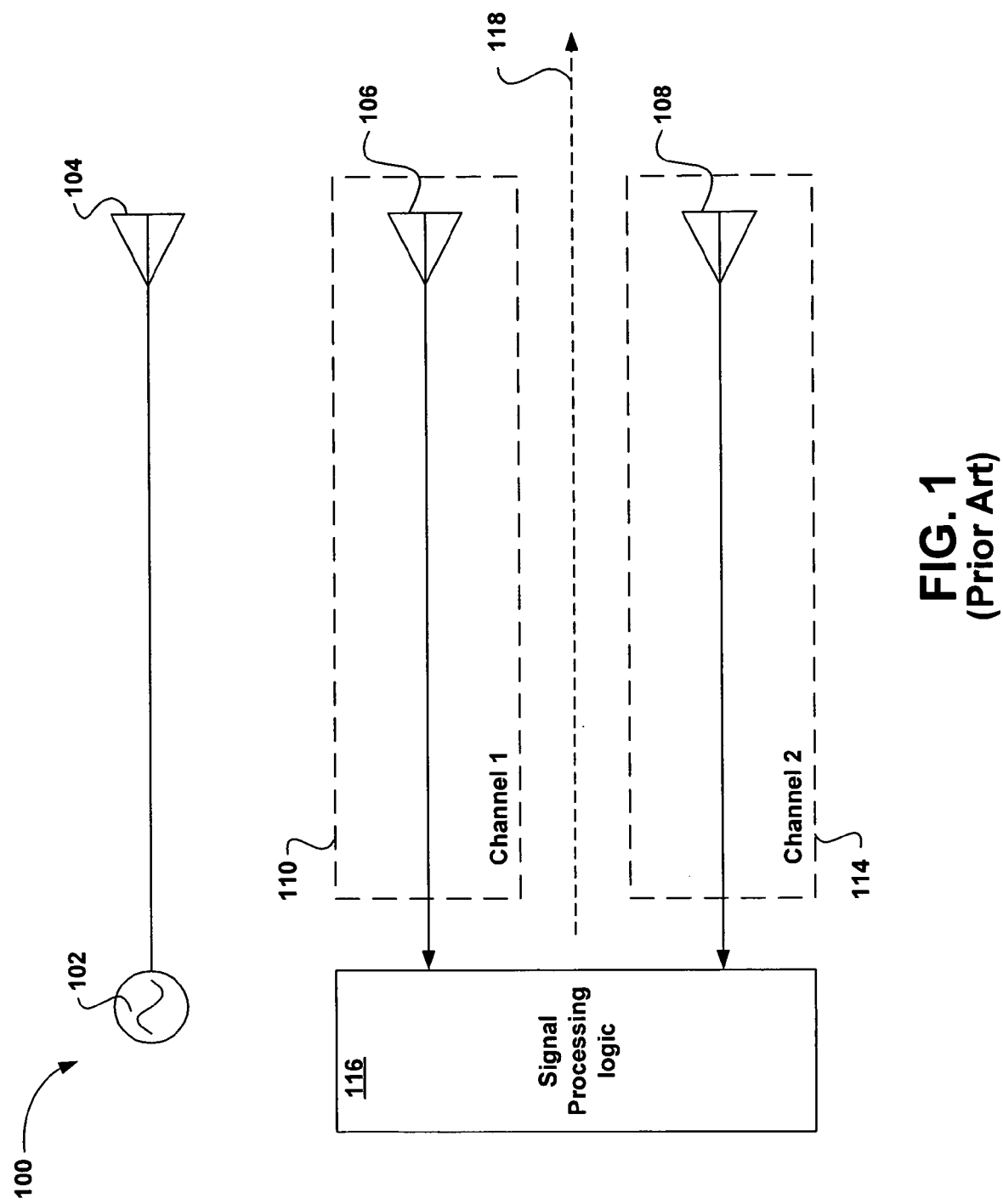
FIG. 1 is a schematic diagram showing an exemplary prior art monopulse detection system.
Figure 2:
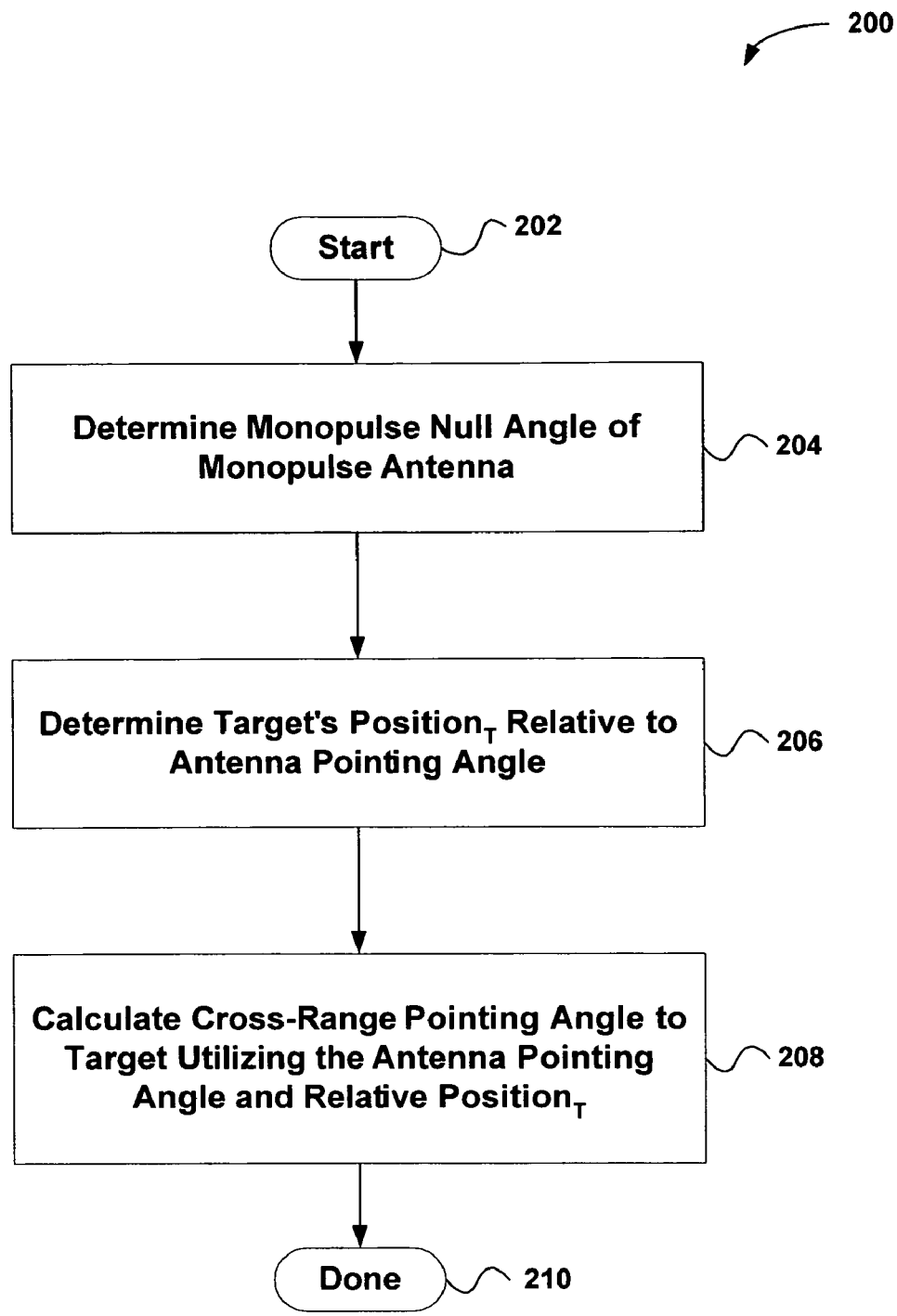
FIG. 2 is a flowchart showing a method for determining the cross-range azimuth pointing angle to a target, in accordance with an embodiment of the present invention.

FIG. 2 is a flowchart showing a method 200 for determining the cross-range azimuth pointing angle to a target, in accordance with an embodiment of the present invention. In an initial operation 202, preprocess operations are performed. Preprocess operations can include, for example, establishing orbit for a spaceborne radar, establishing detection frequencies to be utilized, and other preprocess operations that will be apparent to those skilled in the art after a careful reading of the present disclosure.

In operation 204, the monopulse null angle of the monopulse antenna is determined. As described in greater detail below, embodiments of the present invention utilize the location and velocity of a planetary body, such as the Earth's surface, combined with location and velocity of the monopulse antenna to determine the monopulse null angle of the monopulse antenna. In this manner, embodiments of the present invention are capable of measuring the monopulse null angle regardless of antenna misalignments or instabilities.

The target's position relative to the antenna boresight angle is determined in operation 206. A monopulse measurement of the target is obtained to determine the target's relative position. As described above, a monopulse detection system detects an azimuth angle to a target using a signal radiated from a transmitting antenna and reflected off the target. The reflected signal is received at the monopulse detection system through two or more receiving feeds. Then, utilizing the phase between the signals received at the individual feeds, data regarding the azimuth angle of the target to the detection system is obtained.

Once the monopulse null angle is determined and the azimuth angle of the target is obtained, the cross-range azimuth pointing angle to the target is calculated based on the monopulse null angle and the azimuth angle of the target. Post process operations are then performed in operation 210. Post process operations can include, for example, transmission of the calculated cross-range azimuth pointing angle to ground tracking stations, further detection operations, and other post process operations that will be apparent to those skilled in the art after a careful reading of the present disclosure.

Figure 3:
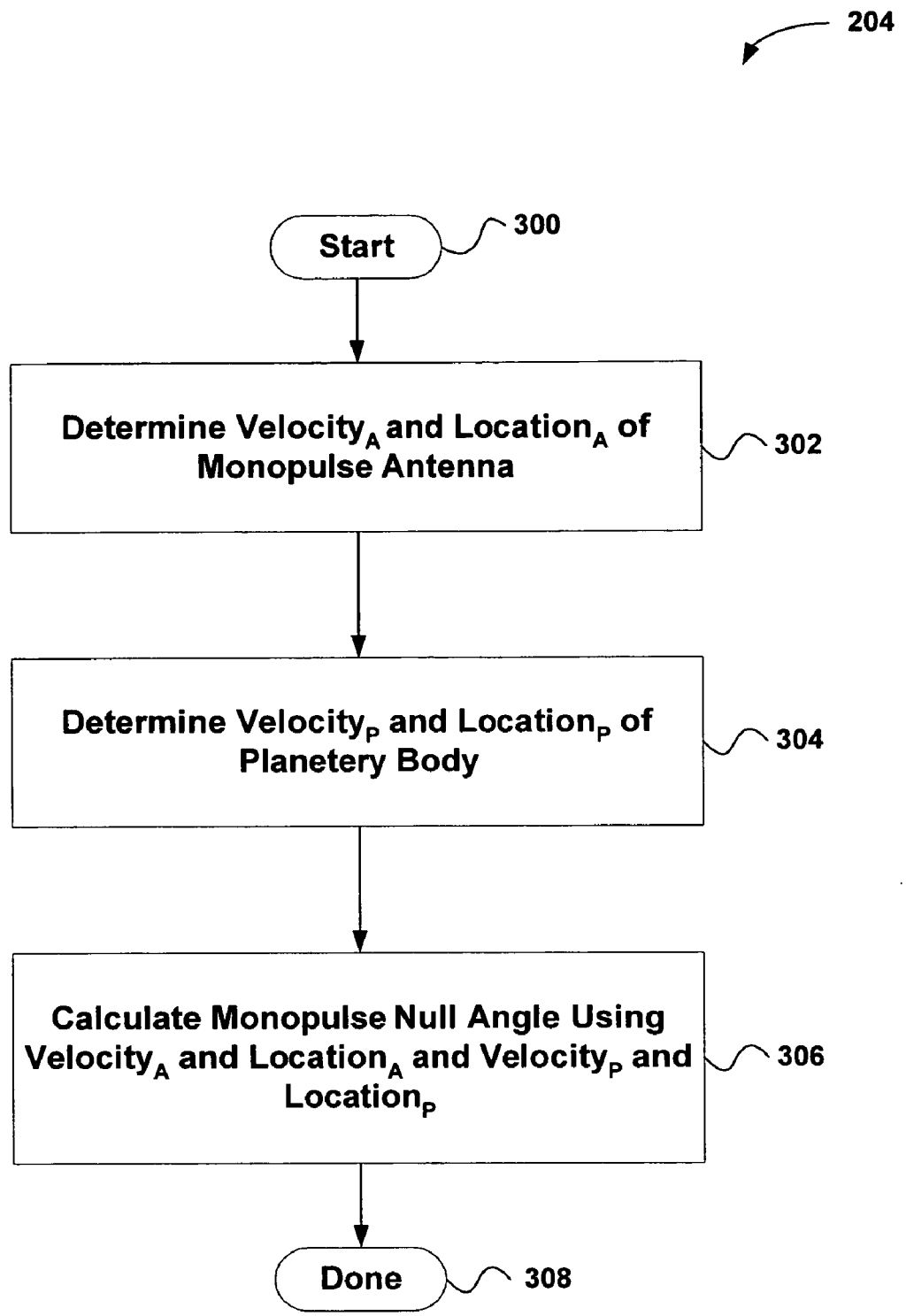
FIG. 3 is a flowchart showing a method for determining the monopulse null angle of a monopulse antenna, in accordance with an embodiment of the present invention.

As mentioned above, embodiments of the present invention determine the monopulse null angle of a monopulse antenna by obtaining a ground signature, which is utilized to deduce very accurately where the antenna is pointing. FIG. 3 is a flowchart showing a method 204 for determining the monopulse null angle of a monopulse antenna, in accordance with an embodiment of the present invention. In an initial operation 300, preprocess operations are performed. Preprocess operation can include, for example, establishing detection frequencies to be utilized, and other preprocess operations that will be apparent to those skilled in the art after a careful reading of the present disclosure.

In operation 302, the velocity and location of the monopulse antenna are determined. As will be appreciated by those skilled in the art, current technologies are available for determining the location and velocity of the monopulse antenna. For example, when the monopulse antenna is part of a spaceborne radar system, the location and velocity of the monopulse antenna can be determined with extremely good accuracy utilizing current technology.

The location and velocity of a surface of a planetary body, such as the Earth's surface, is determined in operation 304. As will be described in greater detail subsequently, embodiments of the present invention utilize returns from the terrain to calculate the current monopulse null angle of the monopulse antenna.

In operation 306, the monopulse null angle is calculated utilizing the velocity and location of the monopulse antenna in combination with the velocity and location of the surface of the planetary body. Embodiments of the present invention calculate the monopulse null angle from measured Doppler frequencies and from the radar speed and wavelength. Post process operations are then performed in operation 308. Post process operations can include, for example, calculating the cross-range azimuth pointing angle to the target, transmission of the cross-range azimuth pointing angle to the target to a base station, and other post process operations that will be apparent to those skilled in the art.

Figure 4:
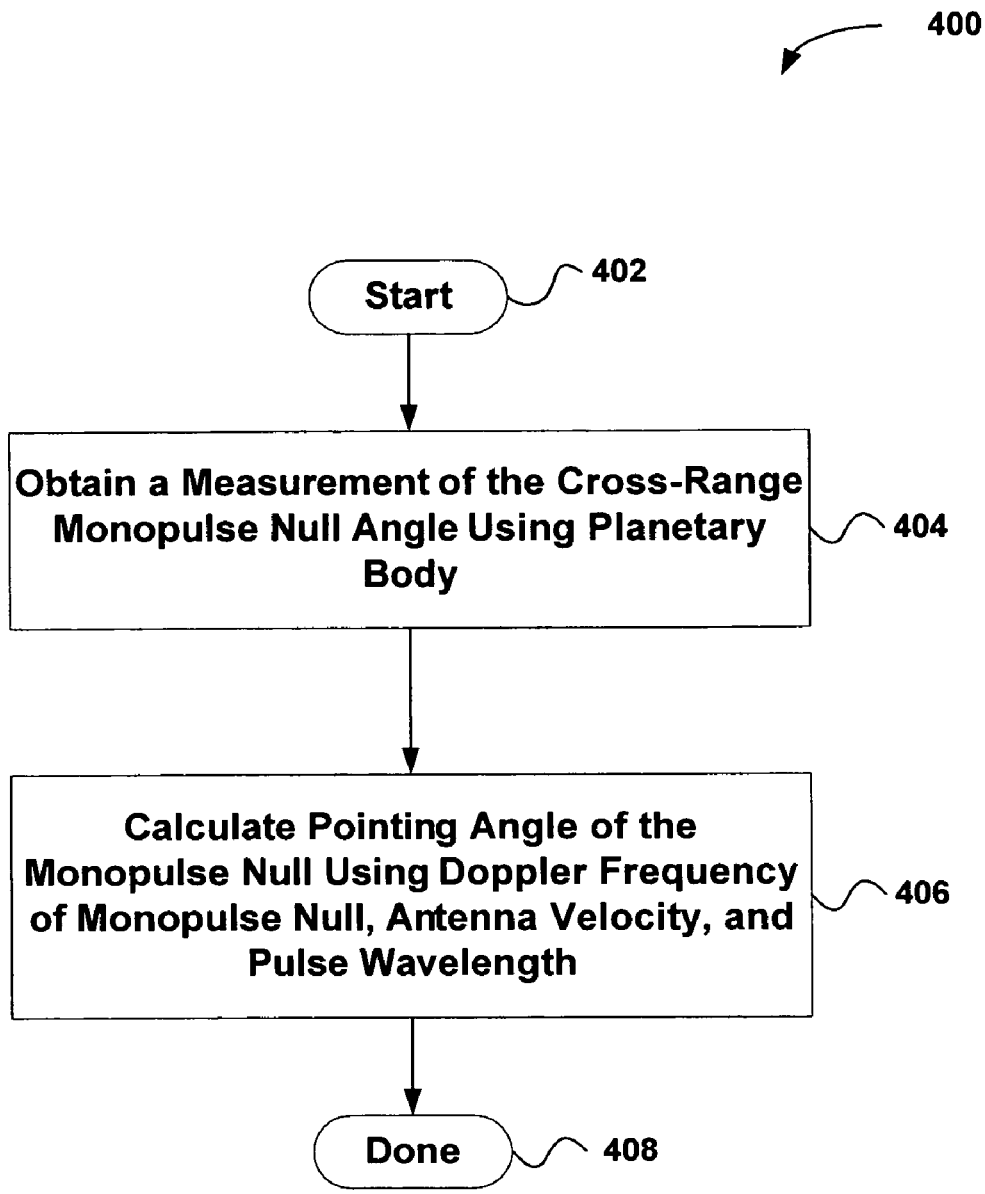
FIG. 4 is a flowchart showing a detailed method for determining the current monopulse null angle of a monopulse antenna, in accordance with an embodiment of the present invention.

FIG. 4 is a flowchart showing a detailed method 400 for determining the current monopulse null angle of a monopulse antenna, in accordance with an embodiment of the present invention. In an initial operation 402, preprocess operations are performed. Process operations can include, for example, establishing detection frequencies to be utilized, and other preprocess operations that will be apparent to those skilled in the art after a careful reading of the present disclosure.

In operation 404, a measurement of the cross-range monopulse null angle is obtained utilizing the planetary body. Broadly speaking, embodiments of the present invention broadcast pulses of energy to the planetary surface, such as the Earth's surface, which are reflected back to the antenna. However, because the energy is traveling at the speed of light, the energy comes back earlier from parts of the Earth that are closer to the spacecraft than from parts of the Earth that are farther away.

Hence, embodiments of the present invention divide the energy that comes back into chunks in time as the energy is returning. The strength of the energy is measured as a function of time, and digitized by turning the measured energy strength into an array of numbers that are stored in range bins, which represent a range of time as the reflected energy is received.

Figure 5:
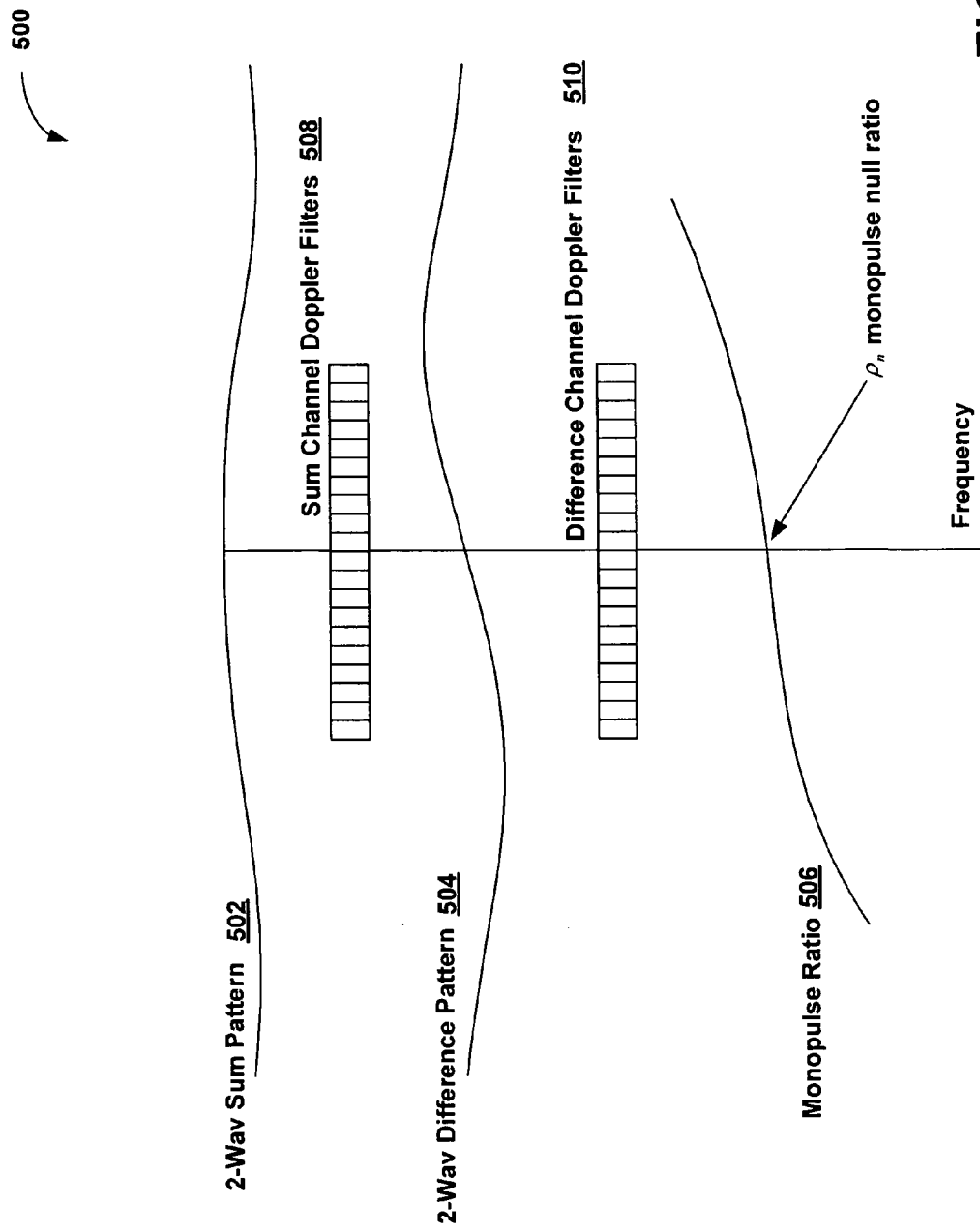
FIG. 5 is a graph showing exemplary returned energy patterns within a single range bin, in accordance with an embodiment of the present invention.

FIG. 5 is a graph showing exemplary returned energy patterns 500 within a single range bin, in accordance with an embodiment of the present invention. The exemplary returned energy patterns 500 include a sum pattern 502, a difference pattern 508, and monopulse ratio 506, which is the difference pattern 504 divided by the sum pattern 502. In addition, sum channel Doppler filters 508 used to store sum pattern data are shown, as are difference channel Doppler filters 510, which are utilized to store the difference pattern data.

When transmitted, a pulse is a complex waveform with a particular center frequency. However, when the pulse hits the ground, differential motion is present because the ground is moving relative to the monopulse antenna. That is, in the various locations on the planetary surface from which the energy is being reflected, different places are moving at different speeds relative to the sensor. As a result, the energy reflected back at the relative speeds has different Doppler shifts. Moreover, the Doppler shift is not a simple Doppler shift, but a smear of Doppler shifts across the range bin. Hence, the energy comes back as a smear of frequencies. These frequencies are divided into frequency components and the energy in each frequency component is measured and stored in the sum and difference Doppler filters 508 and 510.

Because of noise, a single pulse typically does not generate enough information. Also, a sequence of pulses is needed in order to perform the Doppler filtering operation. Thus, the Doppler filters 508 and 510 include information combined over some number of pulses.

Referring back to FIG. 4, the monopulse null angle is calculated in operation 406. As described previously, the null of the difference pattern channel is at the boresight of the monopulse antenna. Hence, the boresight of the monopulse antenna is also referred to as the monopulse null. Embodiments of the present invention utilize the Doppler frequency of the monopulse null in combination with the monopulse antenna velocity, and the pulse wavelength to calculate the monopulse null angle.

Turning to FIG. 5, embodiments of the present invention utilize a bank of sum channel Doppler filters 508 and a bank of difference channel Doppler filters 510 in each range bin. Within a single range bin, as illustrated in FIG. 5, the sum channel Doppler filters 508 and the difference channel Doppler filters 510 are utilized to form the monopulse ratio 506 as shown in the following equation:

$$\rho_f = \Delta_f / \Sigma_f. \tag{1}$$

wherein $\rho_f$ is the monopulse ratio at frequency f, $\Delta_f$ is the difference pattern at frequency f, and $\Sigma_f$ is the sum pattern at frequency f. Thus, the monopulse ratio is a function of frequency.

The monopulse ratios 506 are fit to a curve that approximates the antenna monopulse ratio vs. frequency. Embodiments of the present invention make use of the monopulse null frequency, which is the frequency at which the monopulse ratio is null. The monopulse null ratio, which is the particular monopulse ratio that best approximates the antenna monopulse null frequency, is illustrated in FIG. 5 as $\rho_n$. The frequency, $f_n$, of this null estimate is termed the null frequency.

To reduce error, the sum channel Doppler filters 508 and the difference channel Doppler filters 510 are formed in each of several range bins such that many estimates of $f_n$ are obtained. In this manner, if the antenna azimuth pointing angle is in error by an amount less than a beamwidth (approximately $\lambda/L_A$ radians, where $L_A$ is the length of the real antenna in the velocity direction) the average $f_n$ closely approximates the frequency of the pointing error. In this case, the accuracy (mean plus standard deviation of the error) of the average $f_n$ is much less than the bandwidth subtended by the antenna beam. However, if the error is large compared to an antenna beamwidth, a large mean error (bias error) will occur and degrade the accuracy of the estimate accordingly unless the mean/bias error is measured.

Referring back to FIG. 4, post process operations are then performed in operation 408. Post process operations can include, for example, calculating the cross-range azimuth pointing angle to the target, transmission of the cross-range azimuth pointing angle to the target to a base station, and other post process operations that will be apparent to those skilled in the art.

The following example shows the precision (standard deviation) improvement using one range bin, in accordance with an embodiment of the present invention. In this example the following values will be used:

v=5000 m/s (satellite speed),
$T_a$=0.12 s (coherent integration time),
R=14,224 km (range),
$\lambda$=0.03 m (wavelength),
$d_a$=300 m (azimuth resolution),
$\beta_0$=1.315 mr (antenna beamwidth),
L=590 m (synthetic array length),
Antenna pointing: broadside $v\beta_0$=6.58 m/s (speed subtense),
CNR=15 dB (clutter/noise per filter)
Doppler shift across antenna beamwidth=438 Hz
filters/beamwidth, n=53 (number of Doppler monopulse ratios measured)

In this example, the standard deviation $\sigma_c$ of a Doppler monopulse ratio using clutter in each Doppler cell, is described by:

$$\sigma_c \approx \frac{0.5\beta_0}{\sqrt{nCNR}} = 14.3 \ \mu\text{rad} \quad (2)$$

In the one range bin example, $\sigma_c * R$=204 m. Contrasting this with the standard deviation of a non-Doppler monopulse angle estimate for a 10 sq. m target with a target-to-noise ratio (TNR) of 17 dB:

$$\sigma_T \approx \frac{0.5\beta_0}{\sqrt{TNR}} = 92.8 \ \mu\text{rad} \quad (3)$$

and $\sigma_T * R$=1321 m. In this case, the standard deviation of the target+beam angle estimate is 1337 m.

The frequency of the angle at which the system operator wishes to point the antenna, hereinafter "the desired azimuth pointing angle," is:

$$f_d = \frac{2v}{\lambda}\text{SIN}(\theta) \quad (4)$$

where v is the radar speed, $\lambda$ is the wavelength, and $\theta$ is the desired azimuth pointing angle referenced to the velocity vector, v. The received radar returns are translated to zero frequency using the estimated value:

$$f'_0 = f_0 - \Delta f_0 \quad (5)$$

($f_0$ is in error by an amount $-\Delta f_0$). $\Delta f_0$ is the Doppler equivalent accuracy of antenna pointing. The center of the spectrum to be processed is at:

$$\Delta f_0 = f_c + f_0 - (f_c + f'_0) \quad (6)$$

For very stable antenna structures, the antenna is pointing to the desired angle with an accuracy <<than one beamwidth (corresponding to one Pulse repetition frequency (PRF) line for ambiguity considerations) and $|\Delta f_0|\sim 0$. Here, $|\Delta f_0|>>0$, i.e., $\Delta f_0$ is several PRF lines (beamwidths) off and thus includes a |bias| of several PRF lines or more. The PRF lines are caused by sampling-induced aliasing.

Figure 6:
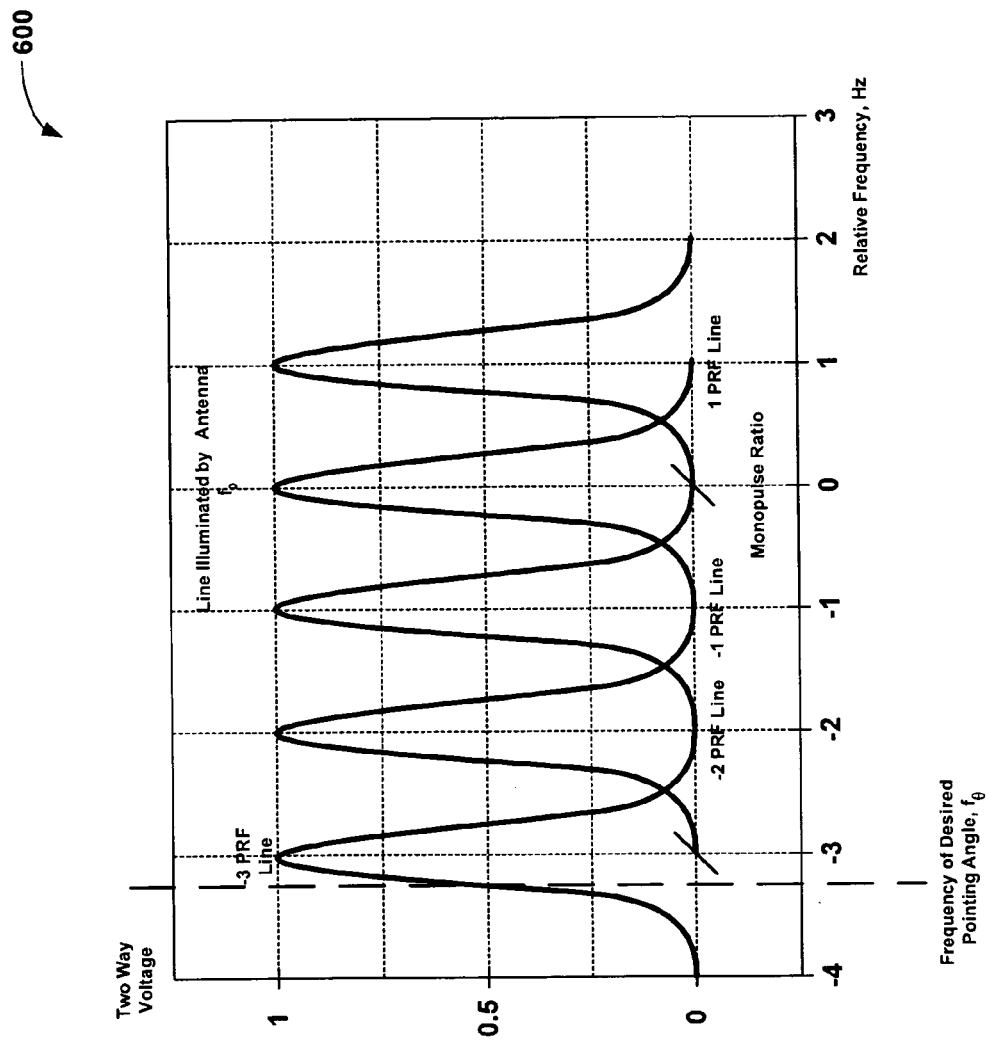
FIG. 6 is a graph showing a sum pattern at successive PRF lines where the frequency of the desired azimuth pointing angle is below the $0^{th}$ PRF line, in accordance with an embodiment of the present invention.

FIG. 6 is a graph 600 showing a sum pattern at successive PRF lines where the frequency of the desired azimuth pointing angle is below the $0^{th}$ PRF line, in accordance with an embodiment of the present invention. In the graph 600 of FIG. 6, $f_0$ and $f_\theta$ are fixed. In addition, the spacing in the example of FIG. 6 is greater than 3 PRF lines. Also, the monopulse ratio, shown around the $-3^{rd}$ PRF line ($f_{-3}$), intersects $f_\theta$ at about −3.3 PRF relative to $f_0$. $f_0$ is at zero frequency on the monopulse ratio.

In the example of FIG. 6, the null frequency, $f_n$, is +0.3 PRF above the zero frequency. A higher PRF would shift the PRF lines away from $f_0$, while a lower PRF would shift the lines toward $f_0$. An increase in the PRF, $\Delta$PRF, would cause the PRF lines to shift away from $f_0$, therefore $f_n$ would shift away from $f_0$ by an amount $\Delta\rho_f$=3 $\Delta$PRF. For example, suppose the Doppler filters are 8 Hz wide (integration time ~0.12 sec) and the PRF is 500 Hz. In this case, a 3 filter change towards 0 monopulse ratio would result from a relative PRF change, $\Delta$PRF=3*8/500=0.048. By using this approach, the magnitude of the number of PRF lines pointing error can be found. Also, the sign of the 0 monopulse ratio change (±) indicates whether $f_\theta$ is above or below $f_0$.

Figure 7:
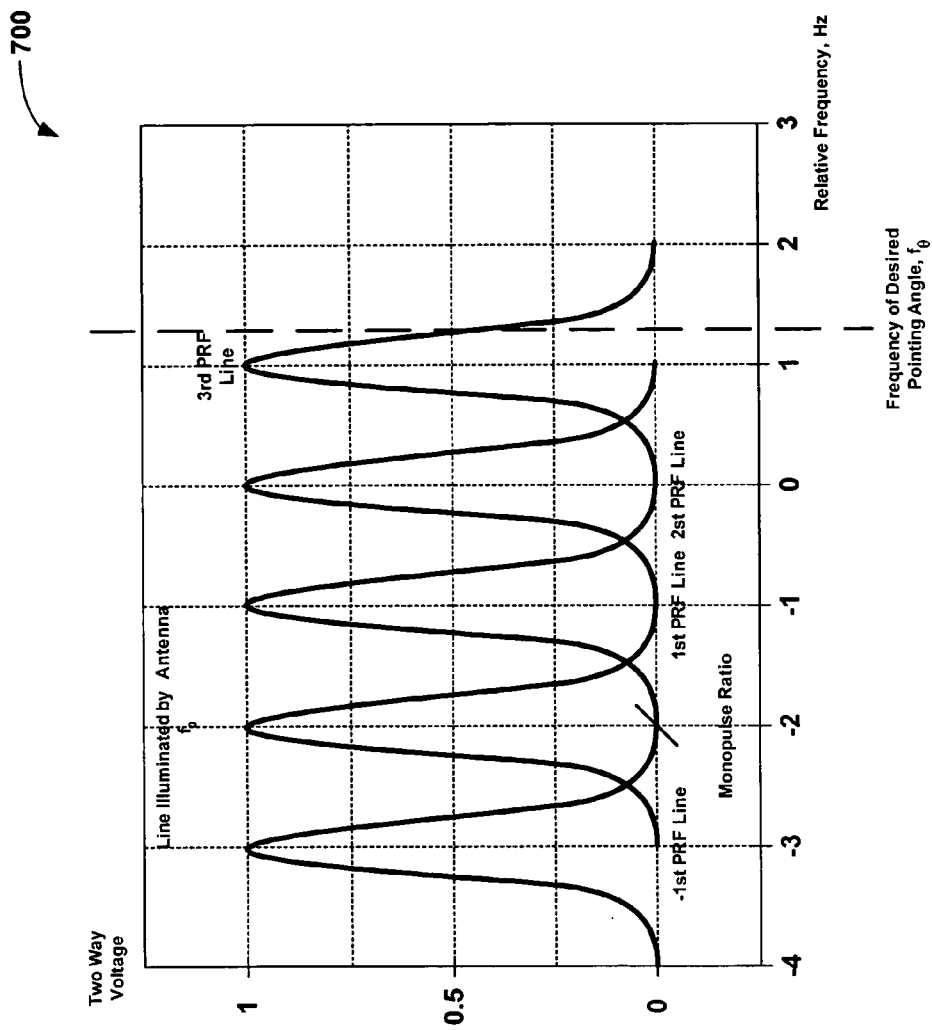
FIG. 7 is a graph showing a sum pattern at successive PRF lines where the frequency of the desired azimuth pointing angle is above the $0^{th}$ PRF line, in accordance with an embodiment of the present invention.

FIG. 7 is a graph 700 showing a sum pattern at successive PRF lines where the frequency of the desired azimuth pointing angle is above the $0^{th}$ PRF line, in accordance with an embodiment of the present invention. Comparing FIG. 6 to FIG. 7, increasing the PRF moves $f_n$ lower towards 0 in FIG. 6, while increasing the PRF moves $f_n$ higher towards 0 in FIG. 7. FIG. 7 shows that if the value of $f_\theta$ is in a region near $f_0 \pm k * $PRF/2 (where k is an integer) and therefore gives low sum return powers, the monopulse ratio standard deviation (equation (2) above) becomes larger due to the low CNR.

To reduce these standard deviations, the sum and difference pattern channels can be replicated by translating the returns into two separate channels centered at $f_0$ and $f_0$+PRF/2 for further processing. In each of these replicated channels, the sum pattern channel 0-frequency filters are formed and the powers from several 0-frequency filter range bins are averaged. The replicated sum pattern channel powers are compared and the sum pattern channel with the highest power is chosen for complete Doppler monopulse processing. If the powers are equal, the channel centered at $f_0$ is chosen. If the channel centered at $f_0+PRF/2$ were chosen, the factor PRF/2 would be included in the estimate of $f_0$. This approach gives a good estimate of the number of PRF lines pointing error.

As can be appreciated, the above discussed embodiments of the present invention provide increased precision. For example, using approximate values in equation (4) above:

$$\hat{f}_d = \frac{2v}{\lambda} SIN(\hat{\theta}) \quad (7)$$

where $\hat{f}_d$ is the estimated Doppler frequency at which the antenna difference channel goes to zero, and $\hat{\theta}$ is the antenna pointing cone angle (referenced to broadside). v and $\lambda$ are the estimated radar speed and wavelength. In this example, v=5000 m/s, $\Delta v$=0.01 m/s, $\lambda$=0.03 m, $\Delta\lambda$=$10^{-7}$ m, $\theta$=20°, $f_d$=236,000 Hz, $\Delta f_d$=1 Hz, and $\Delta\theta_s$=1 µrad (estimated satellite velocity). Then:

$$\frac{d\lambda}{d\theta} = \frac{2v}{f_d}COS(\theta); \Delta\theta_\lambda = \frac{f_d \Delta\lambda}{2vCOS(\theta)} = 2.51 \text{ µrad} \quad (8)$$

$$\frac{dv}{d\theta} = \frac{\lambda f_d COS(\theta)}{2SIN^2(\theta)}; \Delta\theta_v = \frac{2SIN^2(\theta)\Delta v}{\lambda f_d COS(\theta)} = 0.352 \text{ µrad} \quad (9)$$

$$\frac{df_d}{d\theta} = \frac{2vCOS(\theta)}{\lambda}; \Delta\theta_{f_d} = \frac{\lambda \Delta f_d}{2vCOS(\theta)} = 3.19 \text{ µrad} \quad (10)$$

The rss of these three and $\Delta\theta_s$ is:

$$\Delta\theta_{rss} = \sqrt{\Delta\theta_\lambda^2 + \Delta\theta_v^2 + \Delta\theta_{f_d}^2 + \Delta\theta_s^2} = 4.20 \text{ µrad} \quad (11)$$

Thus, the precision possible, using the exemplary values above, is 4.20 µradians, which is equivalent to an error standard deviation of less than 60 meters at a range of 14,224 km.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for determining an azimuth pointing angle of a monopulse antenna, comprising the operations of:
   determining an antenna velocity and an antenna location of a monopulse antenna;
   determining a planetary velocity and a planetary location of a planetary body within range of the monopulse antenna; and
   calculating an azimuth pointing angle of the monopulse antenna based on the antenna velocity, antenna location, planetary velocity, and a planetary location.

2. A method as recited in claim 1, further comprising the operation of broadcasting pulses of energy to a surface of the planetary body.

3. A method as recited in claim 1, further comprising the operation of receiving a plurality of Doppler shifted frequencies.

4. A method as recited in claim 3, further comprising the operation of separating the Doppler shifted frequencies into frequency components and stored.

5. A method as recited in claim 3, further comprising the operation of utilizing the Doppler shifted frequencies to determine the azimuth pointing angle of the monopulse antenna.

6. A method as recited in claim 1, wherein the planetary body is Earth.

7. A method for determining an azimuth pointing angle of a monopulse antenna, comprising the operations of:
   broadcasting pulses of energy at a surface of a planetary body;
   receiving reflected signals from the surface of the planetary body using a plurality of feeds;
   calculating a monopulse ratio based on a sum pattern and a difference pattern, wherein the sum pattern is based on a sum of the reflected signals received using the plurality of feeds, and wherein the difference pattern is based on a difference of the reflected signals received using the plurality of feeds; and
   calculating an azimuth pointing angle of a monopulse antenna using the monopulse ratio.

8. A method as recited in claim 7, wherein the monopulse ratio is calculated by dividing the difference pattern by the sum pattern.

9. A method as recited in claim 7, further comprising the operation of determining a monopulse null frequency, the monopulse null frequency being a frequency wherein the monopulse ratio is null.

10. A method as recited in claim 9, wherein the azimuth pointing angle of the monopulse antenna is calculated based on the monopulse null frequency.

11. A method as recited in claim 7, wherein the reflected signals comprise a plurality of Doppler shifted frequencies.

12. A method as recited in claim 11, further comprising the operation of separating the Doppler shifted frequencies into frequency components.

13. A method as recited in claim 12, further comprising the operation of measuring energy in each frequency component and storing a representation of the measured energy in sum and difference Doppler filters.

14. A system for determining an azimuth pointing angle of a monopulse antenna, comprising:
   a transmitting feed capable of broadcasting pulses of energy at a surface of a planetary body;
   a plurality of receiving feeds capable of receiving reflected signals from the surface of the planetary body;
   logic that calculates a monopulse ratio based on a sum pattern and a difference pattern, wherein the sum pattern is based on a sum of the reflected signals received using the plurality of feeds, and wherein the difference pattern is based on a difference of the reflected signals received using the plurality of feeds; and
   logic that calculates an azimuth pointing angle of a monopulse antenna using the monopulse ratio.

15. A system as recited in claim 14, wherein the monopulse ratio is calculated by dividing the difference pattern by the sum pattern.

16. A system as recited in claim 14, further comprising logic that determines a monopulse null frequency, the monopulse null frequency being a frequency wherein the monopulse ratio is null.

17. A system as recited in claim 16, wherein the azimuth pointing angle of a monopulse antenna is calculated based on the monopulse null frequency.

18. A system as recited in claim 14, wherein the reflected signals comprise a plurality of Doppler shifted frequencies.

19. A system as recited in claim 18, further comprising logic that separates the Doppler shifted frequencies into frequency components.

20. A system as recited in claim 19, further comprising sum and difference Doppler filters that store a representation of energy measured in each frequency component.

* * * * *